United States Patent [19]
Winter et al.

[11] 3,905,783
[45] Sept. 16, 1975

[54] METHOD OF PURIFYING AN AIR OR GAS FLOW OF VAPOROUS OR GASEOUS IMPURITIES ADSORBABLE IN FILTERS

[75] Inventors: Karl Winter, Dortmund-Solde; Gunter Staschik, Halingen, both of Germany

[73] Assignee: Ceag Dominit, Aktiengesellschaft, Dortmund, Germany

[22] Filed: June 22, 1973

[21] Appl. No.: 372,628

[30] Foreign Application Priority Data
June 28, 1972 Germany.............................. 2231640

[52] U.S. Cl............................................. 55/31; 55/74
[51] Int. Cl............................................. B01d 53/04
[58] Field of Search............... 55/59, 62, 74, 58, 31, 55/32, 33, 179

[56] References Cited
UNITED STATES PATENTS

| | | |
|---|---|---|
| 3,085,379 | 4/1963 | Kiyonaga et al.................... 55/62 |
| 3,494,102 | 2/1970 | Dunn..................................... 55/62 |
| 3,527,024 | 9/1970 | McMinn et al. ....................... 55/62 |
| 3,540,188 | 11/1970 | Banvere et al........................ 55/62 |
| 3,554,904 | 1/1971 | Humphries............................. 55/62 |

*Primary Examiner*—Charles N. Hart
*Attorney, Agent, or Firm*—Herbert L. Lerner

[57] ABSTRACT

Method of purifying an air or gas flow of vaporous or gaseous impurities adsorbable in filters which includes passing the flow through an adsorption filter for purifying the flow, passing a counter-flow of an inert gas formed from the combustion of at least one of carbon, coke and hydrocarbon substance through the adsorption filter after it has attained a predetermined loading of the impurities so as to desorb the adsorption filter, cooling the inert gas laden with the desorbed impurities so as to condense the desorbed impurities, and then separating the condensed desorbed impurities together with condensed water from the remainder of the inert gas flow.

5 Claims, 1 Drawing Figure

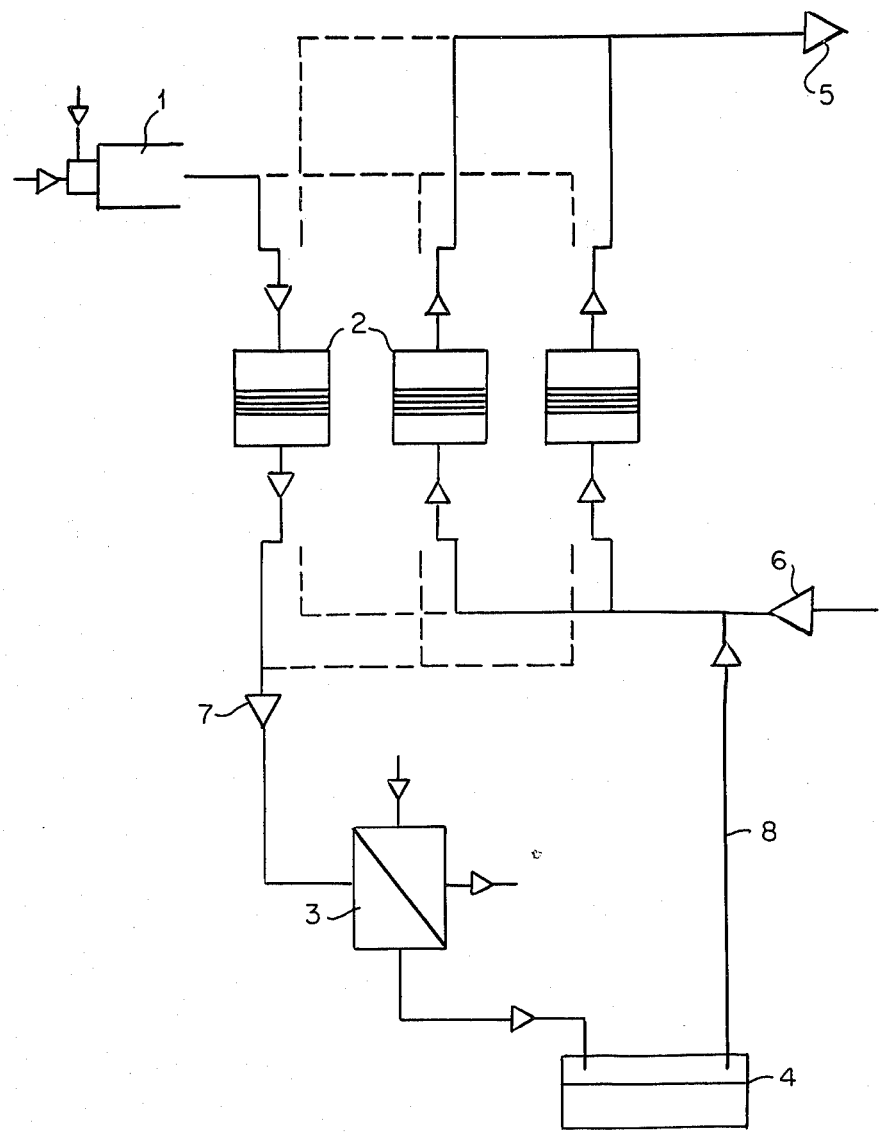

METHOD OF PURIFYING AN AIR OR GAS FLOW OF VAPOROUS OR GASEOUS IMPURITIES ADSORBABLE IN FILTERS

The invention relates to a method of purifying an air or gas current of combustible vaporous or gaseous impurities adsorbable in filters.

In heretofore known methods and devices for purifying air or other carrier gases, it was possible only with great difficulty or at unbearable expense, to remove or destroy harmful gaseous or vaporous substances. Attempts were in fact first made to get rid of these substances through intense dilution or rarefaction thereof with atmospheric air, also including the ejection or discharge thereof into higher air layers in stationary installations.

A fundamental solution to this problem was not found, however, since intense or strong rarefaction with atmospheric air or ejection into higher air layers, can be carried out in secluded and windy sections but not in areas where the winds are calm which are densely populated and wherein such air contamination or pollution occurs in very large quantities.

To combat the most harmful and undesirable gas components in exhaust gases, attempts have heretofore been made, insofar as gases and vapors were concerned, to separate them out either through adsorption filters, such as, for example, through heaps of activated carbon, or to pass them through a postcombustion device and convert them into harmless substances, whereby, for example, in the ideal case, pure hydrocarbon substances are subjected to total combustion to form carbon dioxide and water. Efforts were also made to reduce the combustion temperatures through the use of catalysts. Both methods have not led, however, to the sought-after goal because, in both instances, the elimination of the annoying gases or vapors is achievable only at non-endurable expense. The use of activated carbon filters alone, for example, is considered to be economically feasible only if the concentration of the contaminations does not exceed about 5 mg per $Nm^3$ of air, because at higher concentrations, the adsorption mass is saturated too quickly. After-burning of the combustible contaminations of the air, for example in catalysts is economical only if the share or fraction consisting of the contaminations is no smaller than about 100 mg per $Nm^3$ of air. For heating all substances participating in the combustion process to the required reaction temperature, this fraction is even much higher. However, in order to prevent unburned gas components from reaching the pure air side when the gas mixture temperatures are too low, additional heating of the gas mixture must be effected to support the combustion. An attempt was made, therefore, to recover the exhaust gas heat through heat exchangers for the combustion process, and to supply additional heat through supplemental heaters. Such devices become so expensive thereby that it does not pay to remove these usually harmful or foul-smelling air pollutants or contaminations with the previous catalytic after-burning installations when they are below a concentration of about 100 mg per $Nm^3$. Thus, heretofore, no satisfactory solution for the removal of the combustible air pollutants or impurities is available in the range of concentration between about 5 mg per $Nm^3$ and 100 mg per $Nm^3$ of air.

In order to encompass a wide range of concentration (from mg to g), a method was developed heretofore for purifying an air or gas flow of combustible vaporous or gaseous contaminants or impurities with the aid of adsorption filters, wherein the air or gas flow is purified through an adsorption filter, the filter after attaining a given loading of the combustible impurities being desorbed initially in a counter-current with heated air; the desorbate being burned in a catalytic after-burning installation, and part of the mixture of remaining air and burned desorbate being again passed through the filter until the loading of the filter has decreased to such an extent that the filter can again be utilized for the purification of the air or gas flow. However, in this process so-called catalyst poisons appear, such as organic phosphorus compounds, for example, which gradually render the installation ineffective.

Another heretofore known method is the economical recovery of solvents from manufacturing processes, wherein they occur as vapors and must be brought under control in order to meet the rules and regulations appertaining thereto established for the particular industry or industries.

In the known methods for rendering the solvent vapors harmless, activated carbon filters are used, among others, as adsorbers to adsorb from the exhausted air-gas-vapor mixture flows, the solvent vapors that have been exhausted together with atmospheric air, and thereby remove them.

Subsequent desorption from the active carbon is effected in accordance with known methods by means of vaporization in order to render the activated carbon absorbable again during industrial charging operations. In view of the possibility of recovering these vapors from the desorbate, as a rule, the desorbate is then cooled further and separated from the water, provided that no more extensive methods such as, for example, subsequent distillation in water-soluble solvents, such as alcohol and acetone and the like, are required.

The primary disadvantage of this known method is the resulting mixture of the desorbate with water, and the expensive devices that are accordingly required for the separation of the desorbate from the water formed from the water vapor or steam used for the desorption.

An object of the invention of the instant application is to eliminate the abovementioned disadvantages and to develop an economical process for purifying an air or gas flow of impurities or contaminants, which are adsorbable in filters, that can be carried out without excessive technical expense and is also economically applicable where only limited amounts of impurities are present.

To this end and in accordance with the invention, there is provided a method of purifying an air or gas flow of vaporous or gaseous impurities adsorbable in filters which comprises passing the flow through an adsorption filter for purifying the flow, passing a counter-flow of an inert gas formed from the combustion of at least one of carbon, coke and hydrocarbon substance through the adsorption filter after it has attained a predetermined loading of the impurities so as to desorb the adsorption filter, cooling the inert gas laden with the desorbed impurities so as to condense the desorbed impurities, and then separating the condensed desorbed impurities together with condensed water from the remainder of the inert gas flow.

In accordance with a further feature of the invention, the flow of impurities and the inert gas flow are passed alternatingly through different adsorption filters in order to be able to carry out the purification process without any interruption of the exhaust gas flow, in continuous operation, and/or at an economical rate for the individual adsorption quantities.

In accordance with another feature of the invention, after separating the condensed water and desorbate from the remaining inert gas flow, the inert gas employed for desorbing the adsorption filter is passed with the flow of impurities again through the adsorption filters that are alternatingly engaged in adsorption operation so that the vaporous remainder of the previously separated substances cannot reach the pure air, but can also yet be separated.

In accordance with additional features of the invention, the method includes drying, with or without cooling, the inert gas before passing it through the adsorption filter in order to obtain a completely anhydrous desorbate and to be able, accordingly, to avoid additional separating processes following the cooling operation.

Other features which are considered as characteristic for the invention are set forth in the appended claims.

Although the invention is illustrated and described herein as embodied, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which a single FIGURE of the drawing shows diagrammatically apparatus for performing the method of the invention.

Referring now to the FIGURE, there is shown therein apparatus which consists primarily of a burner 1, adsorbers 2, a cooler 3 and a separating device 4. A pure or clean air flow 5 is discharged from the apparatus, while raw air flow 6 is admitted thereto after a flow of impurities from the burner 1 has passed through the adsorber 2 it becomes a desorbate current 7 from which, after cooling and separation, there is recovered the remaining desorbate 8. The broken lines represent respective pipe lines that are not in operation. At the locations where these broken lines meet the solid lines, switch-over valves or three way valves are provided.

The method of the invention is based upon a desorption with the aid of inert gas, of a stoichiometric or substoichiometric combustion of coal, coke or the like, of liquid and gaseous hydrocarbons, as well as of city gas, coking plant gas, blast furnace gas, carbonic gas or the like, so that during the subsequent cooling for the condensation of the desorbate, only a minimum of the expenditure with respect to processing technology must be made, because the desorbed substances are, in this case, free of water or contain only a small amount thereof, or the combustion gases can be dried at very low cost prior to being introduced for the desorption step. The particular advantage of such a combination of inert gas-desorption with subsequent cooling of the desorbate, is derived from the double conservation of energy. First, there is the conservation, prior to desorption, of the unnecessary water vaporization, and second, there is the conservation of the unnecessary cooling power loss for the missing moisture of the desorbate during the cooling and condensation of the desorbate. This total advantage is all the more beneficial to the present invention since the heat of vaporization of the water is known to be exceedingly high.

As an example for the surprising economy of this combination, reference is made to a large acetone bath having exhausting suction means at the rim thereof, and wherein fine mechanical parts are cleaned. From such an installation, for example, daily (in two shifts), about 700 kg of acetone evaporate into the atmosphere. The acetone vapors were heretofore brought under control in accordance with existing regulations by being rendered harmless either by being permitted to escape with an adequate air admixture, or by being ejected to locations beyond the region in which they would exert any influence upon the surroundings. This part of the solvent is consequently written off, since a recovery plant of the heretofore conventional and known type could not meet its operational costs and the investment in a recovery plant over other known methods was not justified.

The installation costs for a recovery plant carrying out the method combination of the invention are lower by one-third than the installation costs for a rectifying plant which may become necessary, for example, in addition to the heretofore known desorption methods. A cost comparison shows, in such a case, the surprising advantage of the combination of devices used in carrying out the method of the invention for solvent recovery, so that the economy threshold can be reduced by more than half. Heretofore, this economy threshold was a fraction of about 3 g per $m^3$ of the exhausted solvent vapors, in the totally exhausted waste gas mixture. When the combination of devices for carrying out the method of the invention of the instant application is used, the economy threshold is a fraction of only 1.2 g per $m^3$ of the solvent portion contained in the exhausted waste gas mixture. In the example at hand, through the use and installation of the combination of devices for practising the method of the invention which includes inert gas-desorption and subsequent cooling and condensation, a saving of approximately 40% of the previously written off costs for the lost acetone is produced.

A further advantage is derived during the processing of substances with high boiling points. From the standpoint of operational technology, the task of desorbing substances with higher boiling points is less difficult with the use of inert gas, than with the use of water vapor according to the conventional method. The required temperature, which is higher than the respective boiling temperature of the gas or steam expelling means or agent, is much less expensive when using inert gas. In order, for example, to desorb 1 kg of tetraline, which boils at 208°C, approximately 8 kg of superheated steam at 230° C are required. By contrast, it is possible relatively easily to carry out the desorption step with protective gas (inert gas) from the combustion of city gas at 450° C. The substance to be driven out is more rapidly desorbed, the higher the desorption temperature, and the latter temperature is already automatically determined for example, in the case of the aforementioned city gas. Thus, in the selected example, the installation cost amounts to only about 25% of the cost for a water vapor (steam) desorption device. It is not the high heat of vaporization (and condensation) of the water that determines the desorption capacity of the water vapor, but rather, the temperature and the size of the volume flow of the rinsing gas. The combination according to the invention of inert gas-adsorption with subsequent cooling of the desorbate and condensation, is therefore far superior to the methods heretofore known and used, both with respect to desorption time and the yield of desorbate when compared with one and the same adsorbed substance.

We claim:

1. Method of purifying an air or gas flow of vaporous or gaseous impurities adsorbable in filters which comprises passing the flow through an adsorption filter for purifying the flow, passing a counter-flow of an inert gas formed from the combustion of at least one of carbon, coke and a hydrocarbon substance through the adsorption filter after it has attained a predetermined loading of the impurities so as to desorb the adsorption filter, cooling the inert gas laden with the desorbed impurities so as to condense the desorbed impurities, and then separating the condensed desorbed impurities together with condensed water from the remainder of the inert gas flow.

2. Method according to claim 1 wherein the flow of impurities and the inert gas flow are passed alternatingly through different adsorption filters.

3. Method according to claim 1 wherein, after separating the condensed water and desorbate from the remaining inert gas flow, the inert gas employed for desorbing the adsorption filter is passed with vaporous remainder of impurities again through adsorption filters that are alternatingly engaged in adsorption operation.

4. Method according to claim 1 which comprises drying the inert gas before passing it through the adsorption filter.

5. Method according to claim 1 which comprises drying and cooling the inert gas before passing it through the adsorption filter.

* * * * *